US009950596B2

(12) United States Patent
Clephas et al.

(10) Patent No.: US 9,950,596 B2
(45) Date of Patent: Apr. 24, 2018

(54) SUNSHADE ASSEMBLY AND OPEN ROOF CONSTRUCTION PROVIDED THEREWITH

(71) Applicant: Inalfa Roof Systems Group B.V., Oostrum (NL)

(72) Inventors: Petrus Martinus Josephus Clephas, Sevenum (NL); Ruud Geurts, Helden (NL); Paulus Johannes Wilhelmus Munsters, Uden (NL); Gerardus Franciscus Jacobus Haumann, Venray (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 11 days.

(21) Appl. No.: 15/187,134

(22) Filed: Jun. 20, 2016

(65) Prior Publication Data
US 2016/0368353 A1  Dec. 22, 2016

(30) Foreign Application Priority Data
Jun. 22, 2015  (EP) .................................. 15173180

(51) Int. Cl.
*B60J 7/00* (2006.01)
(52) U.S. Cl.
CPC .................. *B60J 7/0015* (2013.01)
(58) Field of Classification Search
CPC ................................................. B60J 7/0015
See application file for complete search history.

(56) References Cited

U.S. PATENT DOCUMENTS

| 6,691,761 | B1* | 2/2004 | Alkhoury | E06B 9/54 |
| | | | | 160/273.1 |
| 2007/0205636 | A1* | 9/2007 | Gonzalez Merino | B60J 7/003 |
| | | | | 296/214 |
| 2009/0145559 | A1* | 6/2009 | Glasl | B60J 1/2041 |
| | | | | 160/273.1 |
| 2010/0032991 | A1 | 2/2010 | Keller | |

FOREIGN PATENT DOCUMENTS

| DE | 102006048459 A1 | 1/2008 |
| EP | 2151339 A1 | 2/2010 |

OTHER PUBLICATIONS

International Search Report and Written Opinion for related European patent application No. 15173180.9, dated Nov. 27, 2015.

\* cited by examiner

*Primary Examiner* — Lori L Lyjak
(74) *Attorney, Agent, or Firm* — Steven M. Koehler; Westman, Champlin & Koehler, P.A.

(57) ABSTRACT

A sunshade assembly includes a flexible sunscreen and two opposed longitudinal guides for guiding longitudinal edges of the sunscreen. A rotatable winding shaft winds and unwinds the sunscreen. An operating beam is connected to the opposite transversal edge of the sunscreen. Two drive cables are connected to opposite ends of the operating beam. Two positioning members move with the operating beam. Each positioning member extends into a corresponding one of the opposed longitudinal guides. Each of the opposed longitudinal edges of the sunscreen near the opposite transversal edge is provided with a wing folded inward in a direction away from the respective positioning member, so that the wing and the respective positioning member are on opposite sides of the sunscreen. The wing accessible to the respective positioning member from the opposite side of the (Continued)

flexible sunscreen in order to engage the respective positioning member.

16 Claims, 10 Drawing Sheets

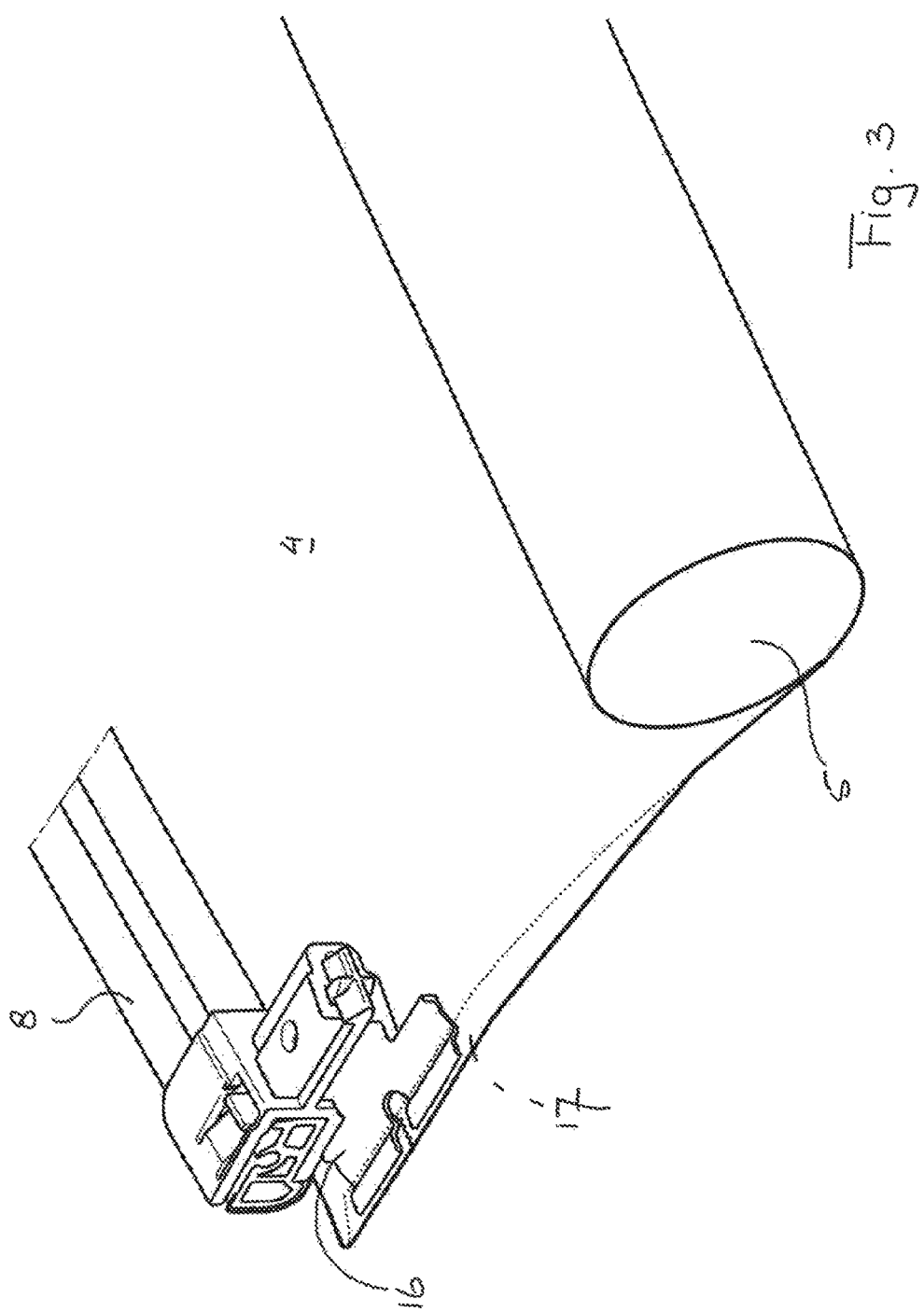

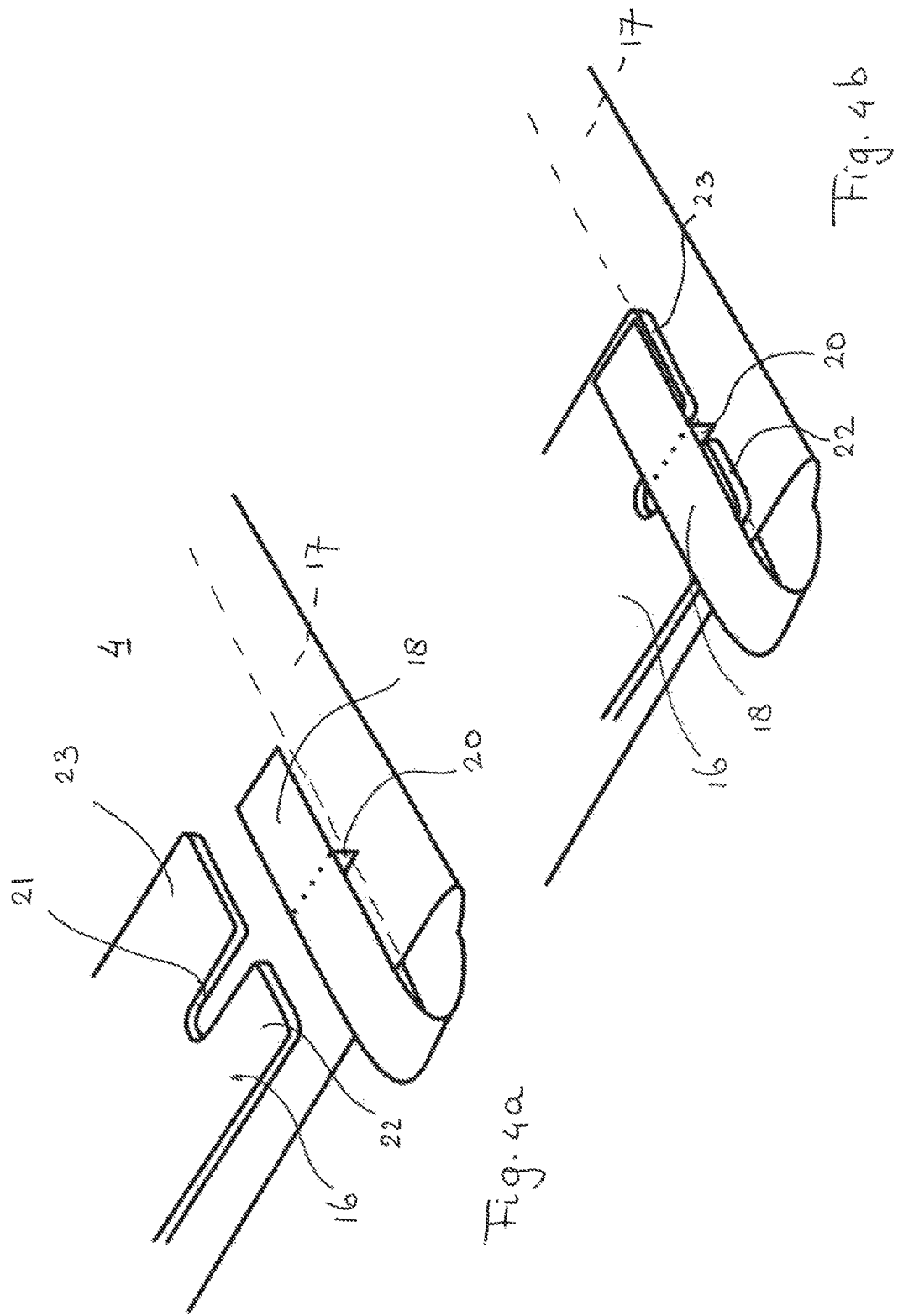

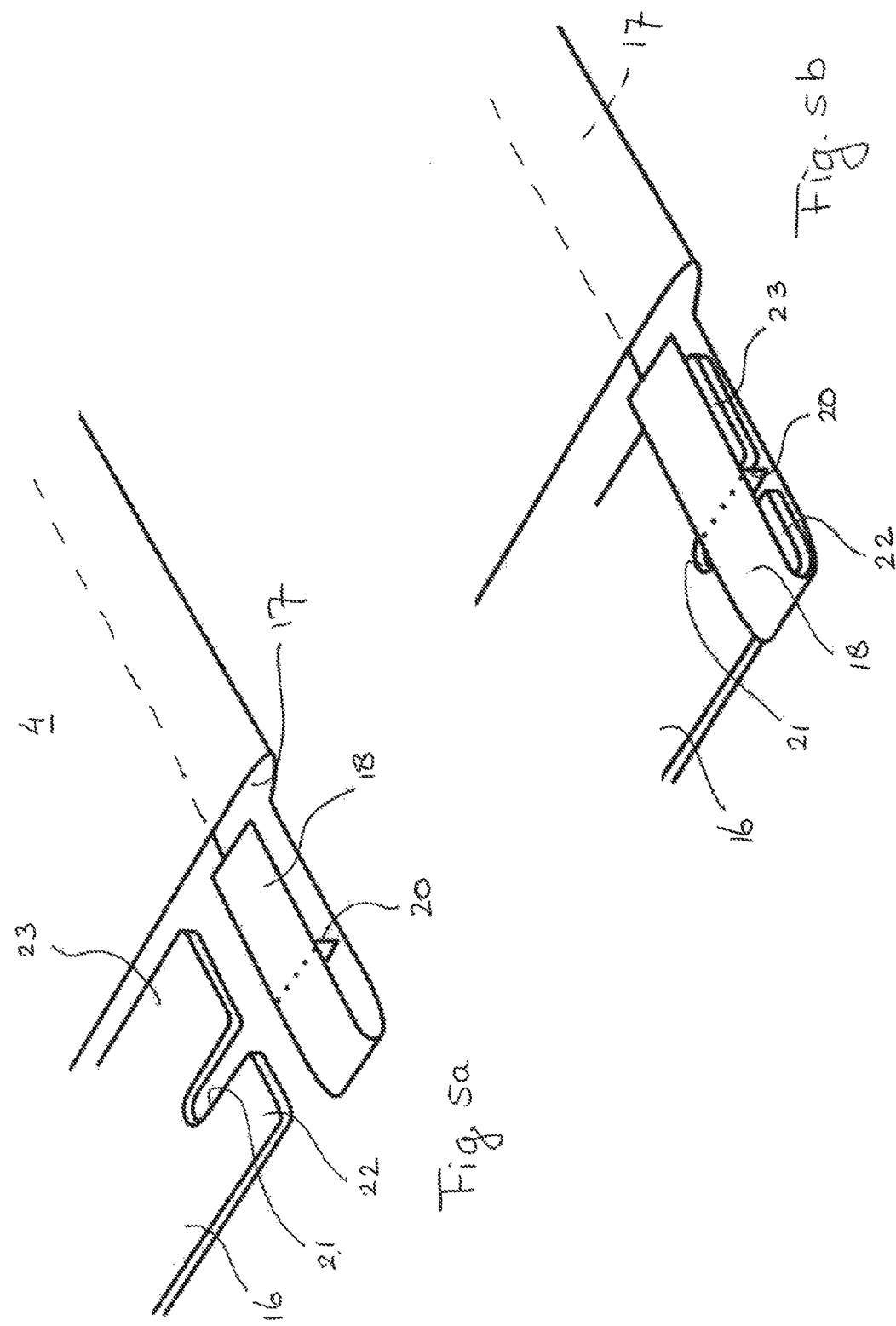

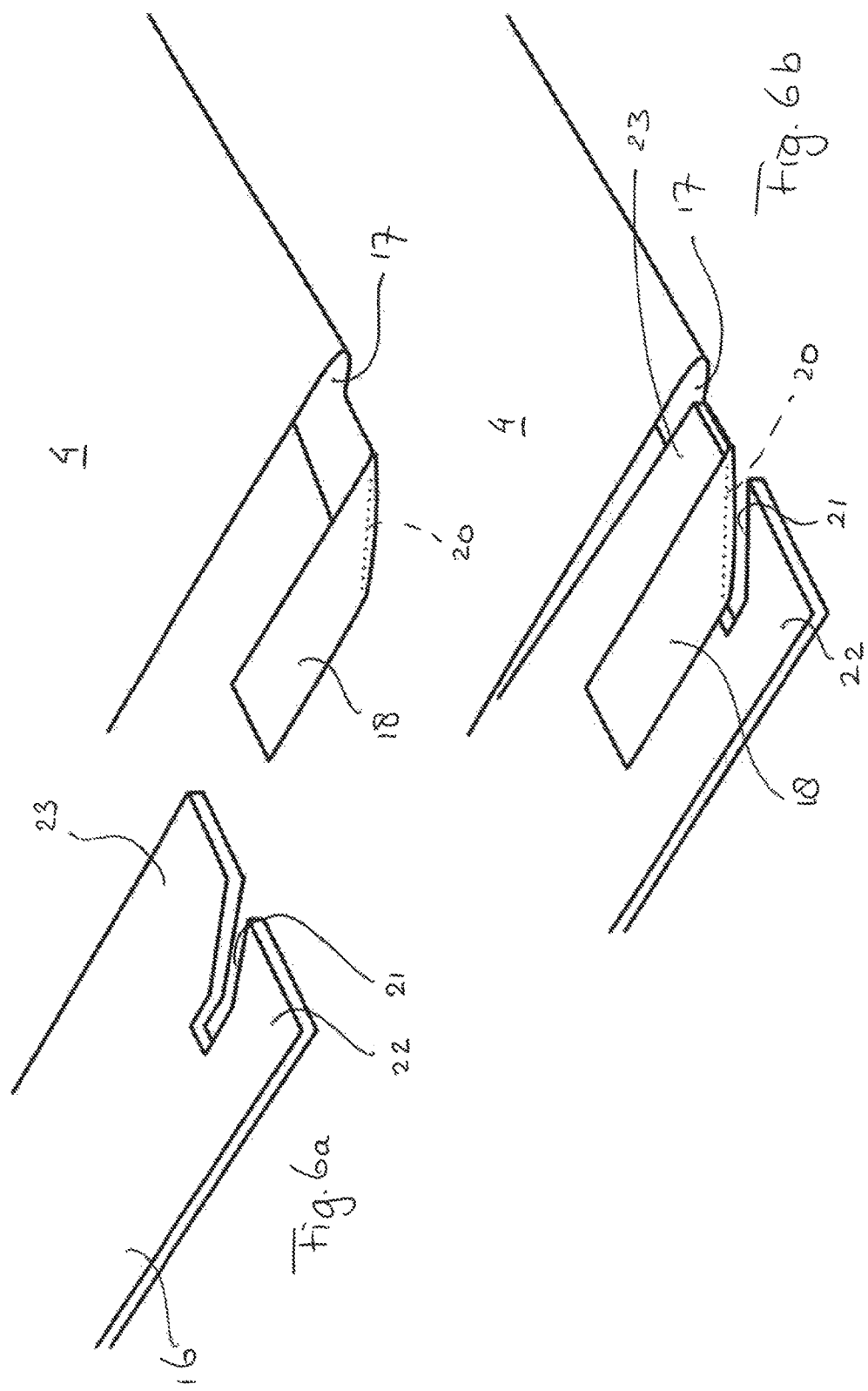

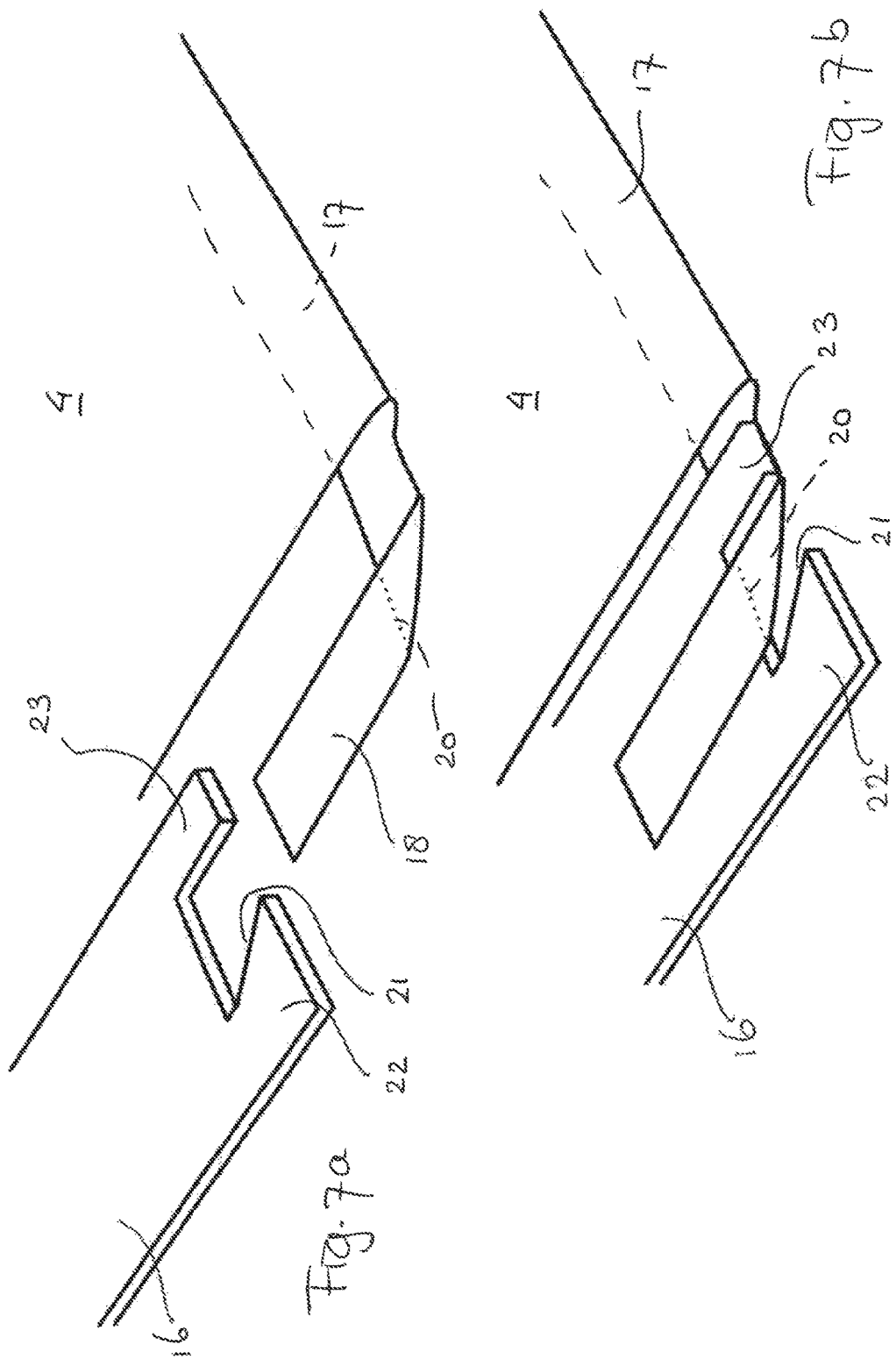

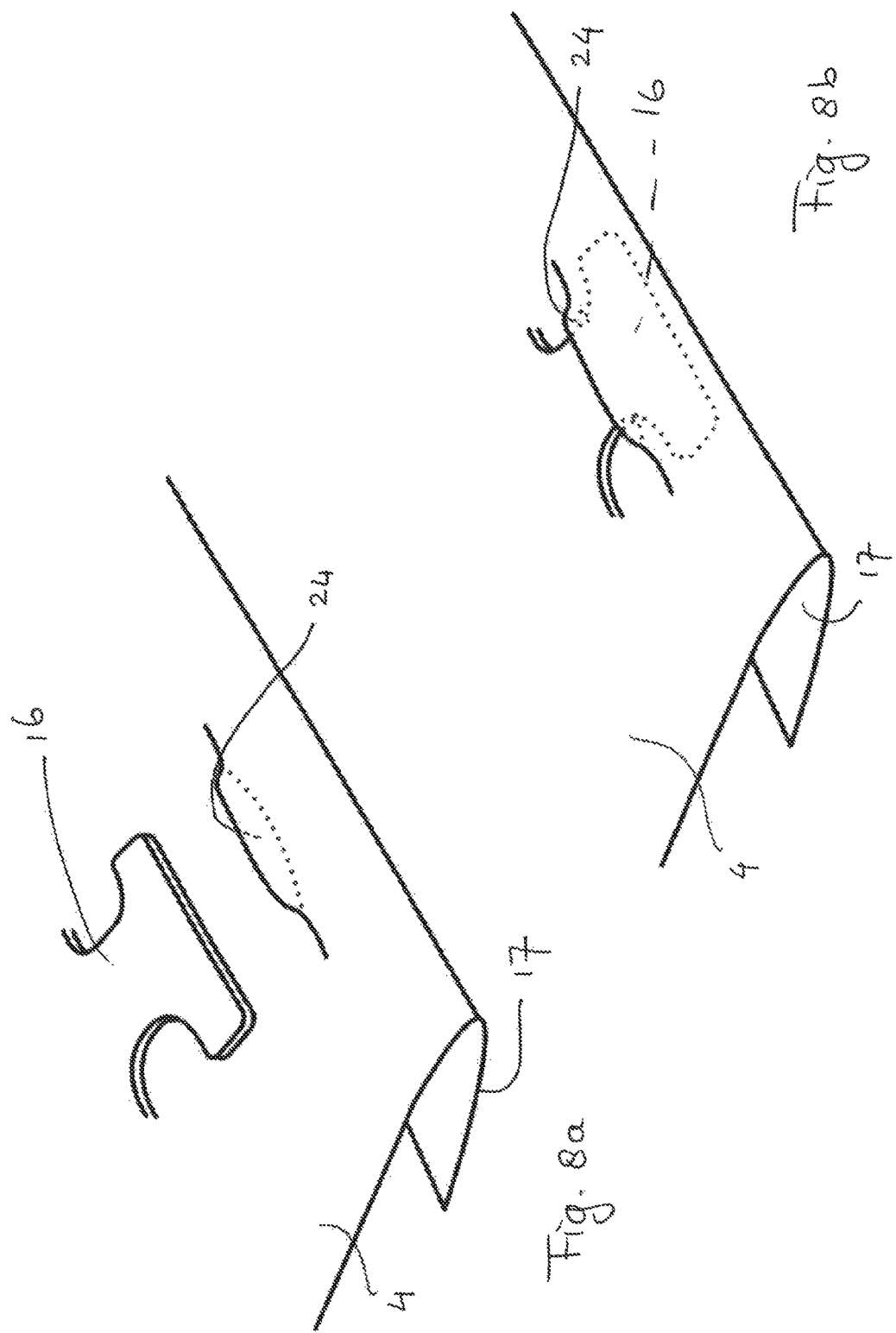

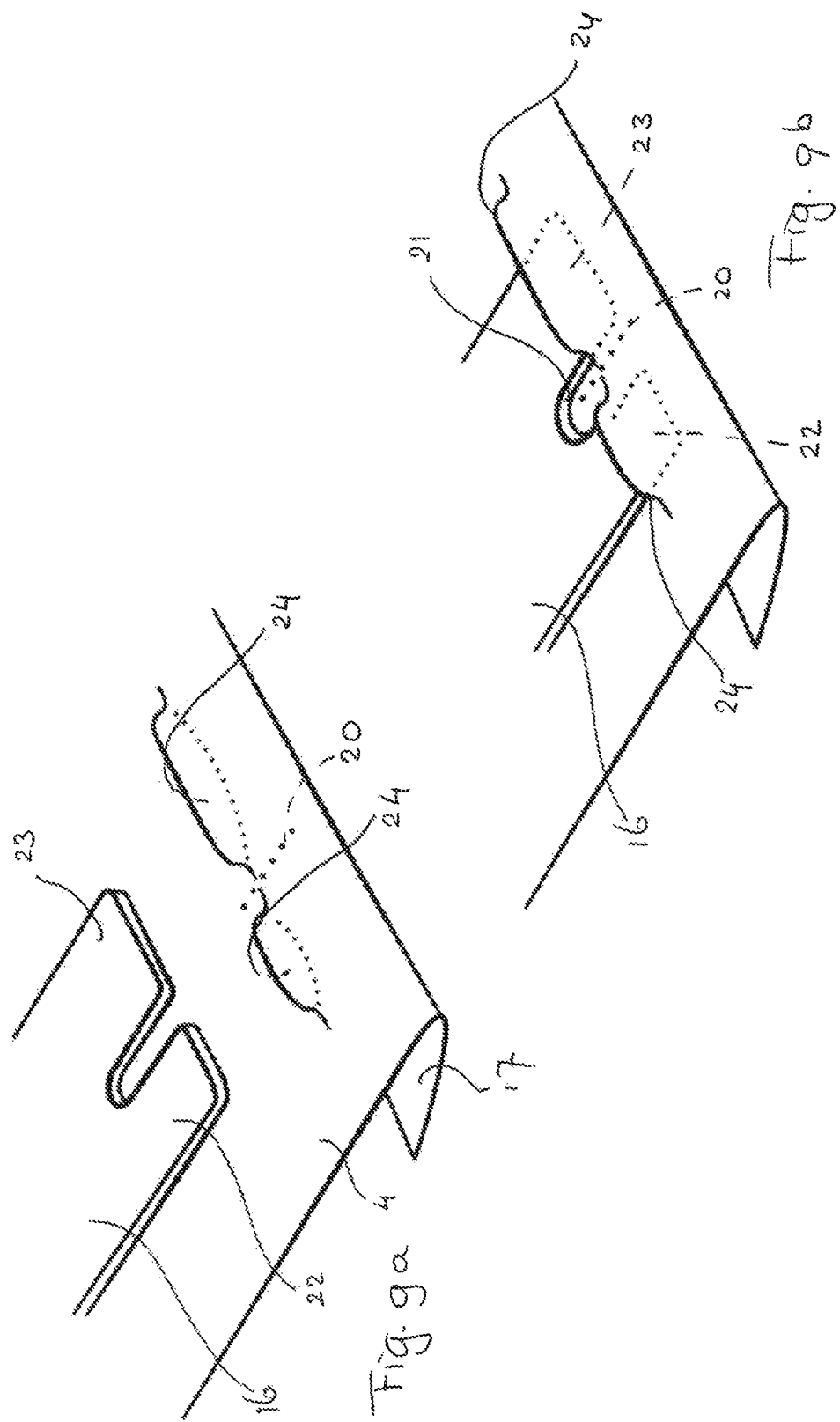

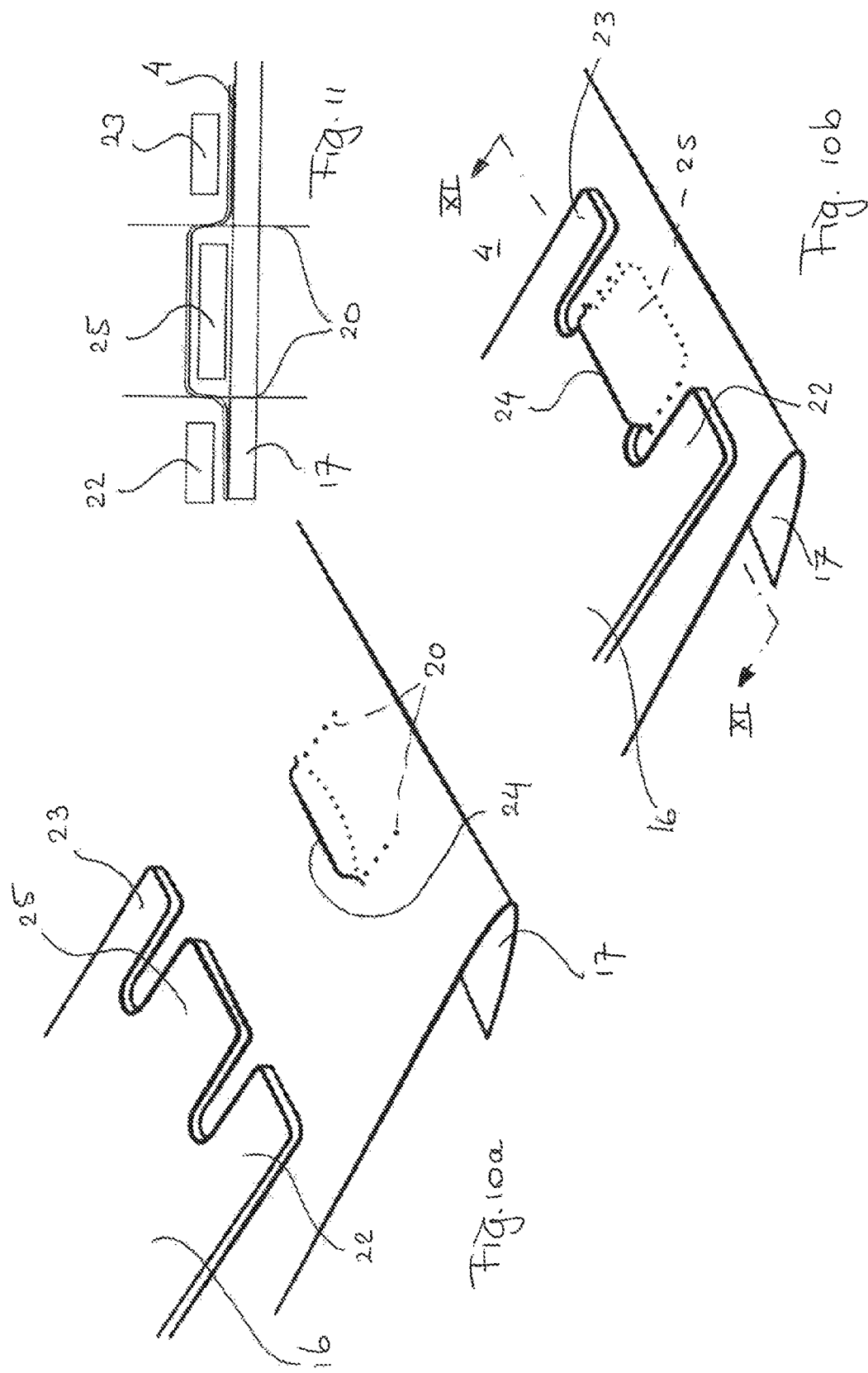

SUNSHADE ASSEMBLY AND OPEN ROOF CONSTRUCTION PROVIDED THEREWITH

BACKGROUND

The discussion below is merely provided for general background information and is not intended to be used as an aid in determining the scope of the claimed subject matter.

Aspects of the invention relate to a sunshade assembly, comprising a flexible sunscreen, a rotatable winding shaft for winding and unwinding the sunscreen, and an operating beam connected to the sunscreen.

One important field of application of such sunshade assemblies are vehicles which are provided with open roof constructions having roof assemblies. Such sunshade assemblies may be integrated into such roof assemblies of open roof constructions during the construction of the vehicles, but also may be provided afterwards (in which case the vehicles are retro-fitted with a so-called after market open roof construction).

In such a sunshade assembly, the operating beam is provided with a positioning member which engages between the wing and the sunshade and is longitudinally locked with respect to the wing so that the positioning member may force the sunscreen in outward and in longitudinal directions. A problem may occur if the positioning member is arranged on a side of the sunscreen opposite to the wing.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

In accordance with an aspect of the present invention a sunshade assembly comprises a flexible sunscreen having opposed longitudinal edges and opposed transversal edges, two opposed longitudinal guides for receiving therein and guiding corresponding ones of the opposed longitudinal edges of the sunscreen, a rotatable winding shaft configured for winding and unwinding the sunscreen at a first one of its transversal edges, an operating beam connected to the second one of the transversal edges of the sunscreen, two drive cables connected to opposite ends of the operating beam and guided in the opposed longitudinal guides in order to wind and unwind the flexible sunscreen, and two positioning members movable with the operating beam, wherein each positioning member extends into a corresponding one of said opposed longitudinal guides, and wherein each of the opposed longitudinal edges of the sunscreen at least near the second one of the transversal edges is provided with a wing folded inwards in a direction away from the respective positioning member, so that the wing and the positioning members are on opposite sides of the sunscreen, wherein each wing is made accessible to the respective positioning member from the opposite side of the flexible sunscreen in order to engage it.

By making the wing accessible to the positioning member it is possible to allow them to engage so that the positioning member may act on the sunscreen through the wing. In this way, the position of the wing and of the positioning member with respect to the sunscreen is of no concern.

In a first embodiment, the wing is made accessible to the respective positioning member by separating each wing from the remainder of the sunscreen near the transversal edge of the sunscreen adjacent the operating beam so that each positioning member is engaged with the respective wing without an interfering sunscreen.

One possibility thereof is to extend the wing beyond the respective transversal edge of the sunscreen into a protruding flap which is folded to be engaged with the positioning member.

Extending the wing beyond the transversal edge of the sunscreen makes the accessibility of the wing independent on the position of the wing and the positioning member with respect to the sunscreen as the flap may be folded towards the side of the sunscreen facing away from the wing.

The protruding flap may be folded back and attacked to one of itself and the surface of the sunscreen, the positioning member engaging the flap where it is attached, for example by means of legs straddling the position of attachment.

If the flap is folded onto itself and attached to itself, the flap can remain protruding from the sunscreen so that the sunscreen cannot interfere with the attachment of the positioning member to (the flap of) the wing anyhow.

It is conceivable that the flap is folded inwardly sideways and wherein overlapping portions of the flap are attached to each other and parts of the positioning members straddle the position of attachment.

Thus the flap does not have to be folded back but can also be folded sideways as long as there are overlapping parts which can be attached to each other to form a point of engagement for the positioning member.

Preferably, the flap is folded inwardly such that the folded flap portion extends substantially in transversal direction of the sunshade.

In another embodiment, each wing is made accessible by means of at least one hole in the sunscreen adjacent the respective wing, and wherein at least a protruding part of the positioning member is inserted through the at least one hole towards the respective wing.

In this case the wing is not separated from the sunscreen, but is locally made accessible by means of one or more holes through which the positioning member can be inserted to be engaged with the wing.

The at least one hole may be substantially slot-shaped so as to provide access to a flat protruding part of the positioning member.

The wing and the portion of the sunscreen that is overlapped by the sunscreen may be attached to each other on one or both sides of the at least one hole.

This provides a point of engagement in both longitudinal directions for the positioning member.

The positioning member may comprise a plurality of spaced apart, substantially parallel protruding parts inserted into a corresponding number of holes in the sunscreen.

Attachment of the wing to itself or the sunscreen is done by stitching. This is an easy way to accomplish the attachment.

An aspect of the invention secondly relates to an open roof construction or roof assembly kit for a vehicle having an opening in a stationary roof. The kit comprises a movable closure panel configured for opening and closing said roof opening and a sunshade assembly having one or more features herein described.

BRIEF DESCRIPTION OF THE DRAWINGS

Hereinafter aspects of the invention will be elucidated while referring to the drawing, in which:

FIG. 3 shows, schematically and in a perspective view, a part of the sunshade assembly for illustrating its operation;

FIGS. 4a, b-10a, b show, schematically and in a perspective view, embodiments of the engagement of the positioning member and wing of the sunscreen.

FIG. 11 is a cross section along line XI-XI in FIG. 10b.

DETAILED DESCRIPTION OF THE ILLUSTRATIVE EMBODIMENTS

Figure 1:
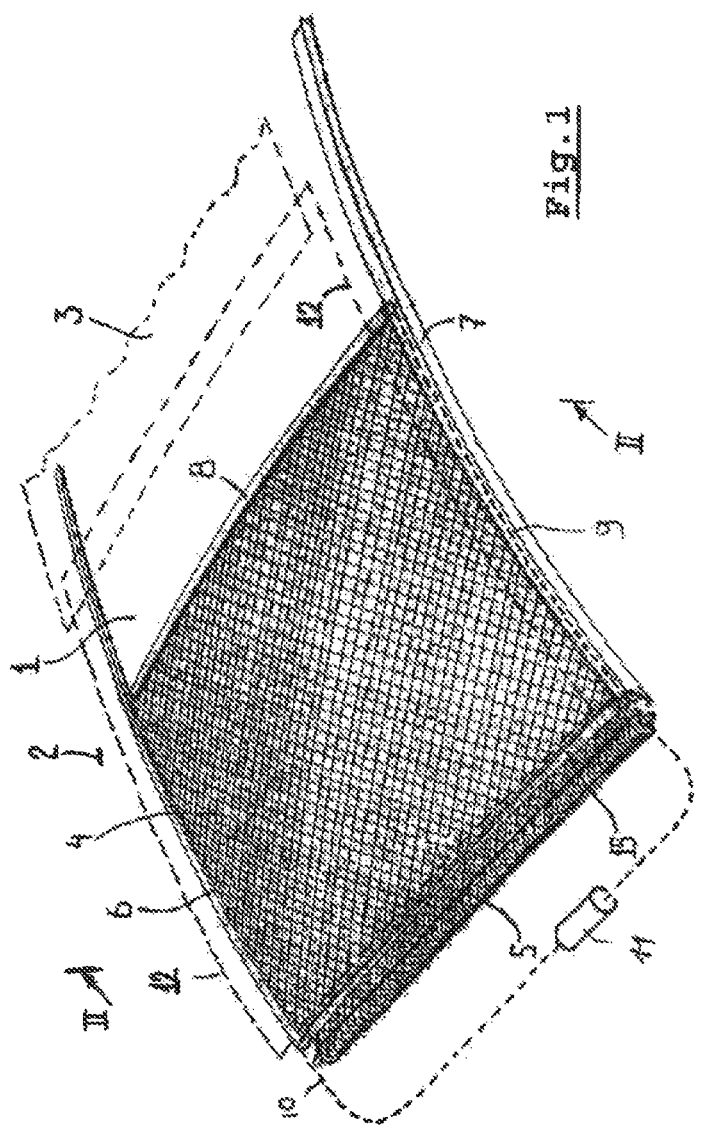
FIG. 1 shows, schematically and in a perspective view, a sunshade assembly applied to an open roof construction.

Firstly referring to FIG. 1, an open roof construction having a roof assembly for a vehicle (schematically represented by a stationary roof 2) is illustrated schematically. Said roof assembly is for opening and closing a roof opening 1 in a stationary roof part 2 of the vehicle and includes a movable closure, in this case a panel 3 which, by means not illustrated in detail but known per se, can be moved for opening and closing said roof opening 1. Commonly, as is known, the movable panel 3 is guided in longitudinal guides mounted in or formed in the stationary roof part 2 along longitudinal sides 12 of the roof opening 1. A user operated device such as a motor or crank (not illustrated) is operably coupled to the panel 3 via cables or the like to move the panel 3 selectively between its open and closed positions. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4 at a first transversal edge and two opposite longitudinal guides 6 and 7. The guides 6, 7 can be connected to or formed integral from a single unitary body with the guides of the closure panel (not illustrated). Likewise, the guides 6, 7 can be separate from the guides of the panel, in which case the open roof construction comprises a kit, the minimum of which does further include the panel 3 besides the sunshade assembly. Drive members may be provided, which in FIG. 1 have been illustrated schematically by dotted lines 9, 10. As is known per se, the drive members may comprise longitudinal members, such as drive cables, driven by an actuator 11, such as an electric motor or hand crank, for a reciprocating movement for winding and unwinding the sunscreen 4.

Each drive member 9, 10 is connected on its end within the guide to an operating beam 8 provided at and connected to a transversal edge of the sunscreen 4 remote from the winding shaft 5.

Although the reciprocating movement of the sunscreen 4 primarily is generated by the reciprocating movement of the drive members 9 and 10 as caused by the actuator 11, it is possible too that in addition the winding shaft 5 is preloaded in a sense for winding the sunscreen 4 thereon. Further it should be noted that the movement of the sunscreen 4 also may be initiated manually.

Figure 2:
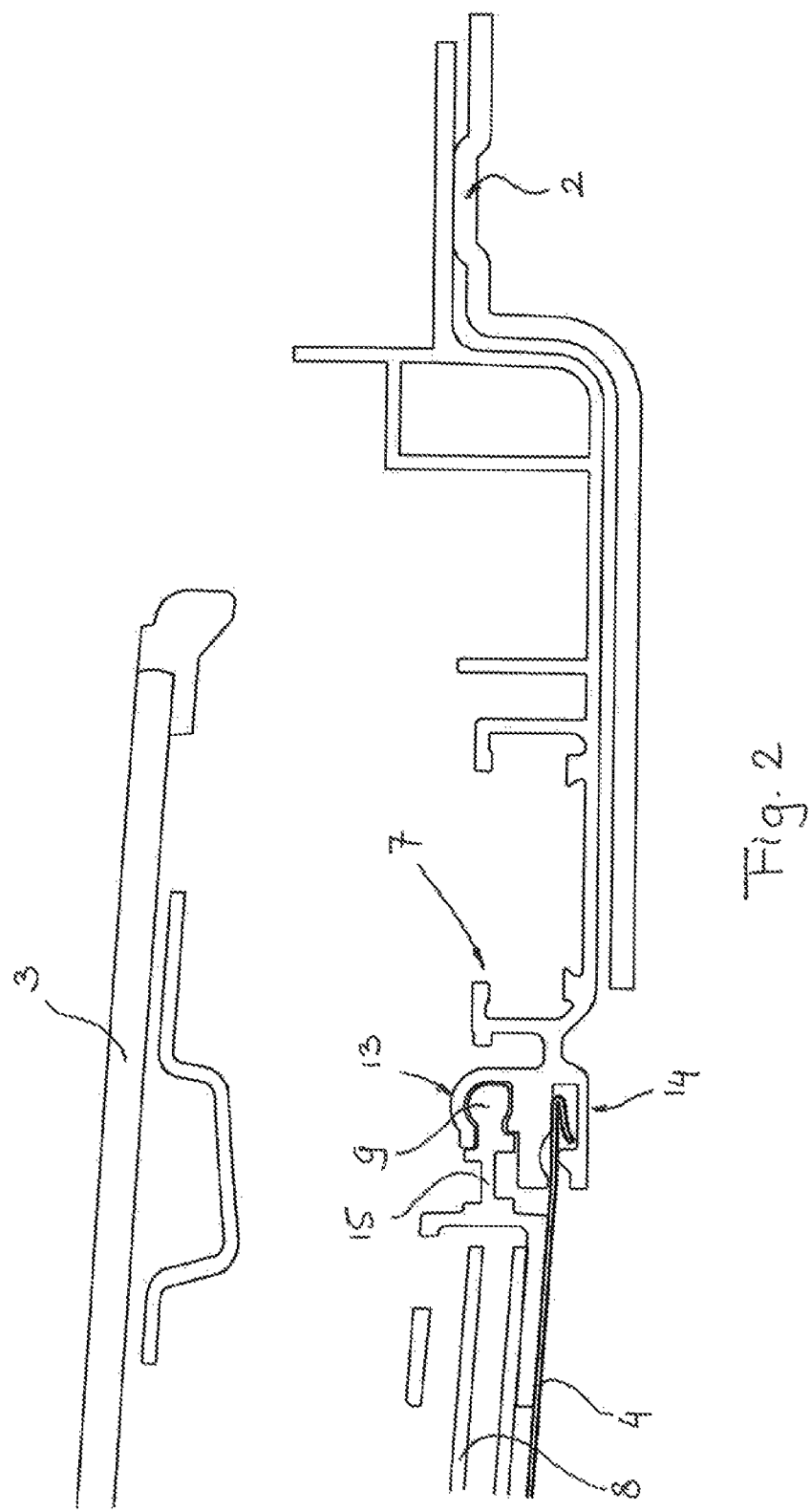
FIG. 2 shows, schematically and in a transverse cross section, a detail of the sunshade assembly.

Now, reference is made to FIG. 2 which schematically illustrates a transverse cross section according to II-II in FIG. 1 (it is noted that only the left half of the cross section is shown, the right half being a mirror image thereof).

FIG. 2 shows the panel 3, right guide 7 (attached to the stationary roof part 2) and operating beam 8. The sunscreen 4 is attached to the operating beam 8 in a manner known and not further elucidated here.

The guide 7 comprises an upper guide channel 13 and a lower guide channel 14. The operating beam 8 has attached to its outer end a mounting part 15 which protrudes into the upper guide channel 13 and which is connected therein to drive member 9. Thus, the operating beam 8 comprises opposite lateral ends each extending into a corresponding upper guide channel 13 and being guided therein, i.e. mounting part 15 engages guide 13 so as to be guided thereby, the guide 13 of which may or may not comprise a channel.

The corresponding longitudinal edge of the sunscreen 4 will be guided in the lower guide channel 14.

Referring to FIG. 3, part of the operating beam 8 near its right end is shown. A positioning member 16 is attached to the operating beam 8. The guide 7 with mounting member 15, upper guide channel 13 and lower guide channel 14 have been omitted in this view to more clearly show the positioning member or lip 16.

The positioning member 16 can be attached to the operating beam 8 through a snap connection (not shown). Thus a releasable connection between the operating beam 8 and positioning member 16 can be created (e.g. for making assembly/disassembly of these parts, and thus the sunshade assembly, easier). However, in another embodiment, the positioning member 16 can be integral with the operating beam 8 being formed from a single unitary body.

Positioning member 16 extends into, and is guided by, lower guide channel 14 (FIG. 2). A wing 17 of the sunscreen 4 is unfolded when the sunscreen 4 is wound onto the winding shaft 5 (FIG. 3) and is folded when it is positioned within the guide 7 (FIG. 2). This wing 17 may be an integral part (transverse prolongation such as being formed from a single unitary body) of the sunscreen 4 or may be a separate part attached to the sunscreen 4 in any appropriate manner (e.g. stitching, gluing etc).

In the illustrated embodiment, the wing 17 has been folded downwardly, i.e. in a direction away from the side of the sunscreen where the positioning member 16 is situated, that is above the sunscreen 4. The positioning member 16 is used to initiate the folding movement of the wing 17 and the wing is therefore engaged with the positioning member 16 in a folded position. When, in a fully or partially closed position of the sunscreen 4 a longitudinal edge thereof comes out of the lower guide channel 14, the position thereof can be restored by fully opening the sunscreen (winding it onto the winding shaft 5) and again moving it to a (partially) closed position. The wing 17 extending around the lip 16 will take care of again positioning the longitudinal edge of the sunscreen into the corresponding lower guide channel 14.

However, as in the illustrated embodiment the positioning member 16 is above the sunscreen 4 and the wing 17 is folded below the sunscreen 4, special measures have been taken to enable an engagement of positioning member 16 and wing 17.

FIGS. 4a, 4b show a first embodiment for the engagement between positioning member 16 and wing 17. In this case, wing 17 has been extended beyond the transversal edge of sunscreen 4 at the position of operating beam 8 to form a protruding lip 18. This transversal edge of sunscreen 4 may be locally displaced by a cut-out in sunscreen 4 so that lip 18 protrudes at a suitable position (not shown here). The lip 18 has been folded back to such an extent that it is overlapping sunscreen 4 and is attached, in this case stitched, to the sunscreen 4 with a transversal stitch 20. The positioning member 16 is a flat lip having a notch 21 to form two legs 22, 23 which can be straddled to the stitch 20. In this manner, the positioning member 16 can push the edge of sunscreen 4 outwardly and can exert forces to the sunscreen in two longitudinal directions.

FIGS. 5a, 5b show a slightly changed embodiment in which lip 18 is folded and stitched onto itself. The positioning member engages lip 18 of wing 17 in front of sunshade 4. However, due to the rigidity of the wing 17 and lip 18, it is still possible to exert an outwardly directed force onto lip 18 and sunscreen 4. In this embodiment, lip 18 creates only two layers, whereas in the FIG. 4 embodiment there are three layers at the position of lip 18: lip 18, sunscreen 4 and wing 17. This package of three layers and positioning member 16 could create height problems in guide 7.

FIGS. 6a, 6b show another embodiment in which lip 18 is not folded back, but sideways in inward direction, so that both lip portions make an angle different from 180 degrees, in this case 90 degrees. A stitch 20 is made at the 45 degrees edge, and notch 21 in positioning member 16 is shaped such that legs 22, 23 are positioned in the fold of wing 17 and fit with stitch 20.

In the FIGS. 7a, 7b embodiment, stitch 20 is made in longitudinal direction and notch 21 and legs 22, 23 are adapted accordingly to cooperate with this stick 20. It is of course also possible to use both stitches 20 of FIGS. 6 and 7 or make any other kind of attachment.

FIGS. 8a, 8b show a different embodiment in that there is no extension of wing 17 to make it accessible for positioning member 16, but there is made an opening 24 (here an elongated slot or slit) in sunscreen 4 adapted to allow positioning member 16 to be inserted into and through this opening 24 to engage wing 17. In this embodiment, there is a single opening 24 and the positioning member 16 is of a size in longitudinal direction which is slightly larger than opening 24 to keep positioning member 16 in opening 20 and to allow positioning member to exert outward forces onto the fold between wing 17 and sunscreen 4. Stitches may be used to strengthen opening 24 in longitudinal direction.

The FIGS. 9a, 9b embodiment comprise two openings 24 to allow legs 22, 23 of positioning member 16 (shaped as in FIG. 4) to enter openings 24. Several stitches 20 may be used to strengthen openings 24 and allow positioning member to exert forces without the risk of tearing openings 24.

FIGS. 10a, 10b and 11 show still another embodiment including one opening 24 in sunscreen 4, but with a positioning member 16 having three legs, a centre leg 25 entering opening 24 while legs 22 and 23 remain above sunscreen 4 to straddle stitches 20 on opposite sides of sunscreen 4.

Although the subject matter has been described in a language specific to structural features, it is to be understood that the subject matter defined in the appended claims is not necessarily limited to the specific features described above. Rather, the specific features and acts described above are disclosed as example forms of implementing the claims. For example, the wing of the sunscreen may be unfolded when wound on the winding shaft, but may also be wound in its folded position.

What is claimed is:

1. A sunshade assembly comprising:
   a flexible sunscreen having opposed longitudinal edges and opposed transversal edges;
   two opposed longitudinal guides configured to receive therein and guide corresponding ones of the opposed longitudinal edges of the sunscreen;
   a rotatable winding shaft configured to wind and unwind the sunscreen at a first one of the transversal edges;
   an operating beam connected to a second one of the transversal edges of the sunscreen;
   two drive cables connected to opposite ends of the operating beam and guided in the opposed longitudinal guides in order to wind and unwind the flexible sunscreen; and
   two positioning members movable with the operating beam,
   wherein an end portion of each positioning member extends into a corresponding one of said opposed longitudinal guides, and
   wherein each of the opposed longitudinal edges of the sunscreen at least near a second one of the transversal edges is provided with a wing folded downwardly and inwardly relative to an upwardly facing surface of the flexible sunscreen between the opposed longitudinal edges such that surfaces of the wings overlap with material of the flexible sunscreen at the longitudinal edges, and
   wherein each wing is made accessible to the respective end portion of each positioning member in order to engage the end portion of each positioning member.

2. The sunshade assembly of claim 1, wherein the wing is made accessible to the respective positioning member by separating the wing from the remainder of the sunscreen near the transversal edge of the sunscreen adjacent the operating beam so that the respective positioning member is engaged with the wing without an interfering part of the sunscreen.

3. The sunshade assembly of claim 2, wherein the wing is extended beyond the respective transversal edge of the sunscreen into a protruding flap which is folded to be engaged with the respective positioning member.

4. The sunshade assembly of claim 3, wherein the protruding flap is folded back and attached to one of itself and a surface of the sunscreen, the respective positioning member engaging the flap where the respective positioning member is attached.

5. The sunshade assembly of claim 4 wherein the respective positioning member is attached to the flap with legs straddling a position of attachment.

6. The sunshade assembly of claim 3, wherein the flap is folded inwardly sideways and wherein an overlapping portion of the flap is attached to itself and a part of the respective positioning member straddle a position of attachment.

7. The sunshade assembly of claim 6, wherein the flap is folded inwardly such that a folded flap portion extends substantially in a transversal direction of the sunshade.

8. The sunshade assembly of claim 1, wherein the wing is made accessible by at least one hole in the sunscreen adjacent the wing, and wherein at least a protruding part of the respective positioning member is inserted through the at least one hole towards the wing.

9. The sunshade assembly of claim 8, wherein the at least one hole is substantially slot-shaped.

10. The sunshade assembly of claim 8, wherein the wing and the portion of the sunscreen that is overlapped by the sunscreen are attached to each other on one or both sides of the at least one hole.

11. The sunshade assembly of claim 8, wherein the respective positioning member comprises a plurality of spaced apart, substantially parallel protruding parts inserted into a corresponding number of holes in the sunscreen.

12. The sunshade assembly of claim 4, wherein attachment of the wing to itself or the sunscreen is done by stitching.

13. An open roof construction including a sunshade assembly comprising:
- a flexible sunscreen having opposed longitudinal edges and opposed transversal edges;
- two opposed longitudinal guides configured to receive therein and guide corresponding ones of the opposed longitudinal edges of the sunscreen;
- a rotatable winding shaft configured to wind and unwind the sunscreen at a first one of the transversal edges;
- an operating beam connected to a second one of the transversal edges of the sunscreen;
- two drive cables connected to opposite ends of the operating beam and guided in the opposed longitudinal guides in order to wind and unwind the flexible sunscreen; and
- two positioning members movable with the operating beam,
- wherein each positioning member extends into a corresponding one of said opposed longitudinal guides,
- wherein each of the opposed longitudinal edges of the sunscreen at least near the second one of the transversal edges is provided with a wing folded inward in a direction away from the respective positioning member, so that the wing and the respective positioning member are on opposite sides of the sunscreen, and
- wherein the respective positioning member is made to engage a lip or an opening of the wing in order to engage the flexible sunscreen.

14. The sunshade assembly of claim 1, wherein the wing is folded downwardly in a direction away from the side of the sunscreen where the respective positioning member is situated.

15. The open roof construction of claim 13, wherein the wing is folded downwardly in a direction away from the side of the sunscreen where the respective positioning member is situated.

16. A sunshade assembly comprising:
- a flexible sunscreen having opposed longitudinal edges and opposed transversal edges;
- two opposed longitudinal guides configured to receive therein and guide corresponding ones of the opposed longitudinal edges of the sunscreen;
- a rotatable winding shaft configured to wind and unwind the sunscreen at a first one of the transversal edges;
- an operating beam connected to a second one of the transversal edges of the sunscreen;
- two drive cables connected to opposite ends of the operating beam and guided in the opposed longitudinal guides in order to wind and unwind the flexible sunscreen; and
- two positioning members movable with the operating beam,
- wherein an end portion of each positioning member extends into a corresponding one of said opposed longitudinal guides, and
- wherein each of the opposed longitudinal edges of the sunscreen at least near a second one of the transversal edges is provided with a wing folded downwardly and inwardly relative to an upwardly facing surface of the flexible sunscreen between the opposed longitudinal edges such that surfaces of the wings overlap with material of the flexible sunscreen at the longitudinal edges, and wherein the end portion of each positioning member engages a surface of each respective wing.

* * * * *